United States Patent
Dann et al.

(10) Patent No.: US 10,510,049 B2
(45) Date of Patent: Dec. 17, 2019

(54) SUBSCRIPTION BASED LOG ENTRY CREATION AND PUBLICATION

(71) Applicant: SAP SE, Walldorf (DE)

(72) Inventors: Wilko Dann, Ketsch (DE); Christian Ortmann, Karlsdorf-Neuthard (DE)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 15/388,375

(22) Filed: Dec. 22, 2016

(65) Prior Publication Data

US 2018/0181917 A1    Jun. 28, 2018

(51) Int. Cl.
*G06Q 10/10* (2012.01)
(52) U.S. Cl.
CPC ................. *G06Q 10/1091* (2013.01)
(58) Field of Classification Search
CPC .... G06Q 10/1091; G06Q 30/04; G06Q 10/06; G06Q 40/00
USPC ............ 705/32, 322, 35, 348, 319; 715/738
See application file for complete search history.

(56) References Cited

U.S. PATENT DOCUMENTS

| | | | | |
|---|---|---|---|---|
| 4,648,037 A * | 3/1987 | Valentino | ............... | G06Q 40/02 235/379 |
| 2002/0065752 A1 * | 5/2002 | Lewis | .................... | G06Q 30/04 705/35 |
| 2008/0157960 A1 * | 7/2008 | Muller | .................... | G06F 9/451 340/540 |
| 2009/0319344 A1 * | 12/2009 | Tepper | ............. | G06Q 10/06393 705/7.39 |
| 2010/0262559 A1 * | 10/2010 | Wilcock | ................. | G06Q 10/00 705/348 |
| 2012/0233044 A1 * | 9/2012 | Burger | .................... | G06Q 10/06 705/32 |
| 2014/0040344 A1 | 2/2014 | Gehring et al. | | |
| 2014/0067702 A1 * | 3/2014 | Rathod | .................. | G06Q 10/10 705/319 |
| 2014/0143350 A1 | 5/2014 | Ortmann et al. | | |
| 2014/0289155 A1 * | 9/2014 | Cooper | ............... | G06Q 10/067 705/322 |
| 2014/0324647 A1 * | 10/2014 | Iyoob | ..................... | G06Q 40/12 705/30 |

* cited by examiner

*Primary Examiner* — Vanel Frenel
(74) *Attorney, Agent, or Firm* — Fish & Richardson P.C.

(57) ABSTRACT

The present disclosure involves systems, software, and computer implemented methods for performing a simulation. In one example, a user performing an accrual simulation identifies a plurality of parameters associated with a simulation, where the simulation calculates time account accruals and the plurality of parameters are selected by a user on a user interface (UI) of the simulation. A publish subject is generated for the simulation. The simulation is called with the plurality of parameters and the publish subject, which can include selecting a time account and passing the publish subject through a plurality of processes associated with the selected time account. The simulation, determines whether one or more subscribers subscribe to the publish subject, and in response to determining that one or more subscribers subscribe to the publish subject, generates log information for each process in the plurality of processes.

20 Claims, 4 Drawing Sheets

SUBSCRIPTION BASED LOG ENTRY CREATION AND PUBLICATION

TECHNICAL FIELD

The present disclosure relates to systems, software, and computer-implemented methods for performing an accrual simulation.

SUMMARY

The present disclosure describes methods and systems, including computer-implemented methods, computer program products, and computer systems for performing an accrual simulation. In an implementation, a user performing an accrual simulation identifies a plurality of parameters associated with a simulation, where the simulation calculates time account accruals and the plurality of parameters are selected by a user on a user interface (UI) of the simulation. A publish subject is generated for the simulation. The simulation is called with the plurality of parameters and the publish subject, which can include selecting a time account and passing the publish subject through a plurality of processes associated with the selected time account. The simulation, determines whether one or more subscribers subscribe to the publish subject, and in response to determining that one or more subscribers subscribe to the publish subject, generates log information for each process in the plurality of processes.

The above-described implementation is implementable using a computer-implemented method; a non-transitory, computer-readable medium storing computer-readable instructions to perform the computer-implemented method; and a computer system comprising a computer memory, interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the systems and/or methods described in the present disclosure can provide an accrual simulator for an accrual service to customers (e.g., human resource (HR) administrators) using the same accrual service. For example, customers can define customer-specific accrual rules and use the accrual simulator to quickly verify accrual calculations based on the defined customer-specific accrual rules. In addition, when there is a problem with accrual calculations (e.g., an employee does not understand an accrual posting in his account), customers can run the accrual simulator, acquire detailed information about the accrual calculation, and provide an answer to the problem. Second, the accrual simulator is built on an accrual service with simple modification to the accrual service program. For example, reactive programming (e.g., RxJava) can be used to write addition code on the accrual service program to log and/or push detailed information about accrual calculations when in a simulation mode. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
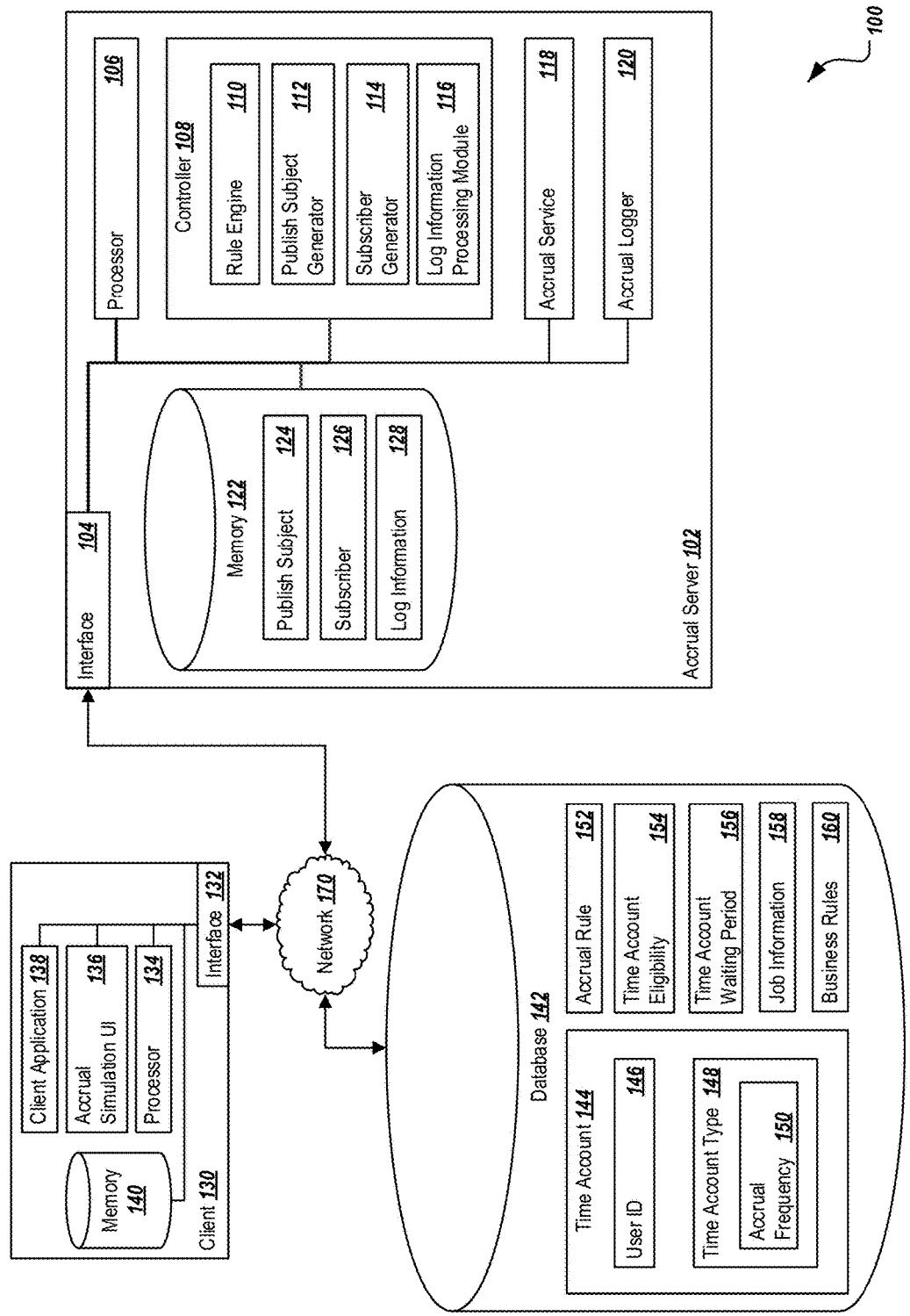
FIG. 1 is a block diagram illustrating an example system for performing an accrual simulation, according to an implementation.

The following detailed description describes performing an accrual simulation and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications, without departing from scope of the disclosure. Thus, the present disclosure is not intended to be limited to the described or illustrated implementations, but is to be accorded the widest scope consistent with the principles and features disclosed herein In accrual calculations, there are many factors that can influence an accrual posting. For example, the factors can include employment information (e.g., hire date, termination date), job information (e.g., time fields, Full Time Equivalents (FTE), seniority), accrual calculation base (e.g., used for accruals based on recorded times), rule definitions (e.g., effective dated, lookup), calculation scenarios (e.g., create, update), time account type settings (e.g., accrual frequency, assigned accrual rules), eligibility, hire/termination, and others. With an accrual simulator, detailed information can be logged during accrual calculations performed during a simulation and can be pushed out for analysis (e.g., checking accuracy of the accrual calculation) to administrators, human resources (HR) professionals, and other authorized users. For example, a user can start a simulation run for a time account by inputting multiple parameters (e.g., a date, a user identification (ID), a time account type) of the particular time account(s) on a user interface (UI) associated with the accrual simulator. The accrual simulator then generates a publish subject and a subscriber, which subscribes to the publish subject, selects the time account based on the multiple parameters, and passes the publish subject to the time account for accrual calculation. During the accrual calculation, the publish subject can log information (e.g., internal information about and results from the accrual calculation) for each processing step of the accrual calculation and push the log information to the subscriber. The subscriber can collect the log information and translate the log information into user-friendly language (e.g., a native language or a relatively friendlier format or presentation). The translated log information can be displayed on the accrual simulator UI for user review, as well as being stored and made available for later analysis. The accrual simulator is built on an accrual service with simple modification to the accrual service program (e.g., small extra code written in RxJava). The extra code is processed only if requested from the calling application (e.g., the accrual simulation). There is no risk of introducing errors to results of the standard accrual service. The backend logging concept (e.g., trigger log entries when needed without creating/extending complicated result objects) can be used for other applications in addition to the accrual calculation.

Turning to the illustrated embodiment, FIG. 1 is a block diagram illustrating an example system 100 for performing an accrual simulation. Specifically, the illustrated system 100 includes, or is communicably coupled with, an accrual server 102, client 130 (or clients 130), a database 142, and a network 170. Although shown separately, in some implementations, functionality of two or more systems or servers may be provided by a single system or server. In some implementations, the functionality of one illustrated system or server may be provided by multiple systems or servers. Additionally, while illustrated as a client-server system, alternative implementations of the solution may be used to allow for client to client transfers, server-to-server transfers, and client- and/or server-to-cloud or other system transfers, as appropriate.

As used in the present disclosure, the term "computer" is intended to encompass any suitable processing device. For example, accrual server 102 may be any computer or processing device such as, a blade server, general-purpose personal computer (PC), Mac®, workstation, UNIX-based workstation, or any other suitable device. Moreover, although FIG. 1 illustrates accrual server 102 as a single system, accrual server 102 can be implemented using two or more systems, as well as computers other than servers, including a server pool. In other words, the present disclosure contemplates computers other than general-purpose computers, as well as computers without conventional operating systems. Further, illustrated accrual server 102, client 130, and database 142 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable servers or computers.

In general, accrual server 102 may be any suitable computing server or system executing applications related to requests for performing an accrual simulation. The accrual server 102 is described herein in terms of responding to requests for performing an accrual simulation from users at client 130 and other clients, as well as other systems communicably coupled to network 170 or directly connected to the accrual server 102. However, the accrual server 102 may, in some implementations, be a part of a larger system providing additional functionality. For example, accrual server 102 may be part of an enterprise business application or application suite providing one or more of enterprise relationship management, data management systems, customer relationship management, and others. In one example, for testing purposes, accrual server 102 may receive a request to perform an accrual simulation for a specific time account, generate a publish subject and one or more subscribers subscribing to the publish subject, call an accrual service with the publish subject, and respond to the request with detailed information about the accrual simulation collected by the one or more subscribers. In some implementations, the accrual server 102 may be associated with a particular uniform resource locator (URL) for web-based applications. The particular URL can trigger execution of multiple components and systems.

As illustrated, accrual server 102 includes an interface 104, a processor 106, a controller 108, an accrual service 118, an accrual logger 120, and memory 122. In general, the accrual server 102 is a simplified representation of one or more systems and/or servers that provide the described functionality, and is not meant to be limiting, but rather an example of the systems possible.

The interface 104 is used by the accrual server 102 for communicating with other systems in a distributed environment—including within the system 100—connected to the network 170 (e.g., client 130, database 142, and other systems communicably coupled to the network 170). The interface 104 may comprise logic encoded in software and/or hardware in a suitable combination and operable to communicate with the network 170 and the controller 108. More specifically, the interface 104 may comprise software supporting one or more communication protocols associated with communications, such that the network 170 or the controller 108 are operable to communicate physical signals with the interface 104 within and outside of the illustrated system 100.

Network 170 facilitates wireless or wireline communications between the components of the system 100 (e.g., between accrual server 102 and client 130 and among others), as well as with any other local or remote computer, such as additional clients, servers, or other devices communicably coupled to network 170, including those not illustrated in FIG. 1. In the illustrated system, the network 170 is depicted as a single network, but may be comprised of more than one network without departing from the scope of this disclosure, so long as at least a portion of the network 170 may facilitate communications between senders and recipients. In some instances, one or more of the illustrated components may be included within network 170 as one or more cloud-based services or operations. For example, the accrual server 102 may be a cloud-based service. The network 170 may be all or a portion of an enterprise or secured network, while in another instance, at least a portion of the network 170 may represent a connection to the Internet. In some instances, a portion of the network 170 may be a virtual private network (VPN). Further, all or a portion of the network 170 can comprise either a wireline or wireless link. Example wireless links may include 802.11ac/ad/af/a/b/g/n, 802.20, WiMax, LTE, and/or any other appropriate wireless link. In other words, the network 170 encompasses any internal or external network, networks, sub-network, or combination thereof operable to facilitate communications between various computing components inside and outside the illustrated system 100. The network 170 may communicate, for example, Internet Protocol (IP) packets, Frame Relay frames, Asynchronous Transfer Mode (ATM) cells, voice, video, data, and other suitable information between network addresses. The network 170 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the accrual server 102 includes a processor 106. Although illustrated as a single processor 106 in FIG. 1, two or more processors may be used according to particular needs, desires, or particular implementations of the system 100. Each processor 106 may be a central processing unit (CPU), an application-specific integrated circuit (ASIC), a field-programmable gate array (FPGA), or another suitable component. Generally, the processor 106 executes instructions and manipulates data to perform the operations of the accrual server 102. Specifically, the processor 106 executes the algorithms and operations described in the illustrated figures, including the operations performing the functionality associated with the accrual server 102 generally, as well as the various software modules (e.g., the controller 108, the accrual service 118, the accrual logger 120), including the functionality for sending communications to and receiving transmissions from client 130.

The accrual server 102 also includes a controller 108. The controller 108 provides an accrual simulation method using the accrual service 118. In operation, the controller 108 creates a publish subject, creates one or more subscribers to the publish subject, passes the publish subject and input data from client 130 to the accrual service 118, and logs information that is pushed by the publish subject. Operations of the controller 108 are executed by the processor 106. In some implementations, the controller 108 may be a software program, or set of software programs, executing on the accrual server 102. In various alternative implementations, the controller 108 may also be an external component from the accrual server 102 and may communicate with the accrual server 102 over a network (e.g., network 170).

As shown, the controller 108 includes a rule engine 110. The rule engine 110 processes accrual rules for accrual calculation. For example, client 130 can define customer-specific accrual rules and the rule engine 110 can process the corresponding accrual rules for accrual calculation. The controller 108 also includes a publish subject generator 112. The publish subject generator 112 may generate one or more publish subjects (e.g., using RxJava) at the time of receiving an accrual simulation request form the client 130 and store the generated publish subjects in publish subject 124. The controller 108 also includes a subscriber generator 114. The subscriber generator 114 may generate one or more subscribers (e.g., using RxJava) subscribing to the one or more publish subjects at the time of receiving an accrual simulation request form the client 130, and store the generated subscribers in subscriber 126. In the illustrated implementation, the controller 108 also includes a log information processing module 116. In operation, the log information processing module 116 may collect log information (e.g., pushed by a publish subject and received by a subscriber subscribing to the publish subject) and store the log information in log information 128. In some implementations, the log information processing module 116 may translate the log information into user-friendly language. In some implementations, the log information processing module 116 may filter the log information to remove unwanted information.

The accrual server 102 also includes an accrual service 118. The accrual service 118 represents an accrual service that calculates accruals based on a set of rules and parameters for one or more persons (e.g., employees). For example, the accrual service 118 can be an accrual service that customers use to perform accrual calculation on at least a subset of their employees. In operation, the accrual service 118 may determine a time account by accessing time account information in database 142 (e.g., time account 144) based on user input data, identify accrual settings (e.g., accrual rule 152) for the time account, and perform accrual calculation for the time account. Operations of the accrual service 118 are executed by the processor 106. In some implementations, the accrual service 118 may be a software program, or set of software programs, executing on the accrual server 102. The accrual service 118 may also be an external component from the accrual server 102 and may communicate with the accrual server 102 over a network (e.g., network 170). In some implementations, accrual service 118 may receive one or more publish subjects as input parameters from the controller 108, in addition to the user input data. As a result, the accrual service may pass the one or more publish subjects to the determined time account for accrual calculation.

The accrual server 102 also includes an accrual logger 120. The accrual logger 120 extends the accrual service 118 by logging detail information (e.g., backend internal data of accrual service 118) of accrual calculation. For example, the accrual logger 120 can be a helper class that builds log items based on internal data available in the accrual service provided by the accrual service 118. In operation, when the accrual service 118 performs accrual calculation for a time account with a publish subject, the accrual logger 120 may determine whether there is at least one subscriber for the publish subject. If there is at least one subscriber, the accrual logger 120 may log internal data during accrual calculation performed by the accrual service 118. When the accrual calculation is finished, the accrual logger 120 may push the log information to the at least one subscriber. In some implementations, when the accrual calculation finishes in error (e.g., unexpected accrual service failure), log information up to the error point can be pushed out from the accrual service 118. Logging information up to the error point can provide fault-tolerance to the accrual simulation application. If there is no subscriber, the accrual logger 120 does not need to perform the log operation. As a result, the accrual logger 120 only processes extra logging code if requested from the calling application (e.g., accrual simulation). There is no risk of introducing errors for the standard accrual service provided by the accrual service 118. In addition, processing the extra logging code only when requested does not impact performance of the accrual service 118, when running in a normal operation mode (e.g., not in a simulation mode). Operations of the accrual logger 120 are executed by the processor 106. In some implementations, the accrual logger 120 may be a software program, or set of software programs, executing on the accrual server 102. The accrual logger 120 may also be an external component from the accrual server 102 and may communicate with the accrual server 102 over a network (e.g., network 170). The accrual logger 120 only logs detail information if requested from the calling application (e.g., the accrual simulation). There is no risk of introducing errors to results of accrual calculations. In addition, logging detail information only when requested does not impact performance of the standard accrual service.

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language, including C, C++, JavaScript, JAVA™, VISUAL BASIC, assembler, Perl®, any suitable version of 4GL, as well as others.

As illustrated, accrual server 102 includes memory 122, or multiple memories 122. The memory 122 may include any memory or database module and may take the form of volatile or non-volatile memory including, without limitation, magnetic media, optical media, random access memory (RAM), read-only memory (ROM), removable media, or any other suitable local or remote memory component. The memory 122 may store various objects or data, including financial and/or business data, application information including URLs and settings, user information, behavior and access rules, administrative settings, password information, caches, backup data, repositories storing business and/or dynamic information, and any other appropriate information including any parameters, variables, algorithms, instructions, rules, constraints, or references thereto associated with the purposes of the accrual server 102. Additionally, the memory 122 may store any other appropriate data, such as VPN applications, firmware logs and policies, firewall policies, a security or access log, print or other reporting files, as well as others. For example, illustrated memory 122 includes publish subject 124, subscriber 126, and log information 128.

The publish subject 124 stores publish subjects created by the publish subject generator 112. The subscriber 126 stores subscribers created by the subscriber generator 114. Each created subscriber stored in the subscriber 126 can subscribe to a specific publish subject in publish subject 124. In some implementations, more than one subscriber in the subscriber 126 can subscribe to the same publish subject in publish subject 124. The log information 128 stores log information about details of accrual calculation performed by the accrual service 118. In some implementations, the log information is internal data of the accrual service 118. In some implementations, the log information can contain non-accrual specific information.

Client 130 may be any computing device operable to connect to or communicate with accrual server 102, other clients (not illustrated), or other components via network 170, as well as with the network 170 itself, using a wireline or wireless connection, and can include a desktop computer, a mobile device, a tablet, a server, or any other suitable computer device. In general, client 130 comprises an electronic computer device operable to receive, transmit, process, and store any appropriate data associated with the system 100 of FIG. 1. In some instances, client 130 can be a particular thing within a group of the internet of things, such as a connected appliance or tool.

As illustrated, client 130 includes an interface 132, a processor 134, an accrual simulation user interface (UI) 136, a client application 138, and memory 140. Interface 132 and processor 134 may be similar to, or different than, the interface 104 and processor 106 described with regard to accrual server 102. In general, processor 134 executes instructions and manipulates data to perform the operations of the client 130. Specifically, the processor 134 can execute some or all of the algorithms and operations described in the illustrated figures, including the operations performing the functionality associated with the accrual simulation UI 136 and the other components of client 130. Similarly, interface 132 provides the client 130 with the ability to communicate with other systems in a distributed environment—including within the system 100—connected to the network 170.

The client 130 also includes or presents an accrual simulation UI 136. The accrual simulation UI 136 provides a user interface between a user and a backend accrual service 118. In operation, the user uses the accrual simulation UI 136 to input data about a time account on which the user wants to perform an accrual simulation. For example, the accrual simulation UI 136 may display multiple fields (e.g., a target date, a user ID, a time account type to run the accrual simulation) for the user to input data associated with a time account and to make a request to run the accrual simulation. In addition, the accrual simulation UI 136 may display accrual results and/or a list of log entries of the accrual simulation for the user to review as a result of the simulation request. Operations of the accrual simulation UI 136 are executed by the processor 134. In some implementations, the accrual simulation UI 136 may be a software program, or set of software programs, executing on the client 130. The accrual simulation UI 136 may also be an external component from the client 130 and may communicate with the client 130 over a network (e.g., network 170).

Client 130 executes a client application 138. The client application 138 may operate with or without requests to the accrual server 102—in other words, the client application 138 may execute its functionality without requiring the accrual server 102 in some instances, such as by accessing data stored locally on the client 130. In others, the client application 138 may be operable to interact with the accrual server 102 by sending requests via network 170 to the accrual server 102 for performing standard accrual calculation. For example, a user can use the client application 138 to define customer-specific accrual rules (e.g., via rule engine 110) and/or run the standard accrual calculation (e.g., via accrual service 118). In some implementations, the client application 138 may be a standalone web browser, while in others, the client application 138 may be an application with a built-in browser. The client application 138 can be a web-based application or a standalone application, developed for the particular client 130. For example, the client application 138 can be a native iOS application for iPad, a desktop application for laptops, as well as others. In another example, the client application 138, where the client 130 is a particular thing (e.g., device) within a group of the internet of things, may be software associated with the functionality of the thing or device.

Memory 140 may be similar to or different from memory 122 of the accrual server 102. In general, memory 140 may store various objects or data, including any parameters, variables, algorithms, instructions, rules, constraints, or references thereto, associated with the purposes of the client 130. Additionally, the memory 140 may store any other appropriate data, such as VPN applications, firmware logs and policies, firewall policies, a security or access log, print or other reporting files, as well as others.

The illustrated client 130 is intended to encompass any computing device such as a desktop computer, laptop/notebook computer, mobile device, smartphone, personal data assistant (PDA), tablet computing device, one or more processors within these devices, or any other suitable processing device. For example, the client 130 may comprise a computer that includes an input device, such as a keypad, touch screen, or other device that can accept user information, and an output device that conveys information associated with the operation of the client application 138 or the client 130 itself, including digital data, visual information, or an accrual simulation UI 136, as shown with respect to the client 130. Further, while illustrated as a client system, client 130 may be exchanged with another suitable source for performing an accrual simulation in other implementations, and is not meant to be limiting.

The illustrated database 142 is a file storage that is used to store time account information for accrual calculation. The database 142 may be similar to or different from memory 122 of the accrual server 102. As illustrated, the database 142 includes time account 144, accrual rule 152, time account eligibility 154, time account waiting period 156, job information 158, and business rules 160. The time account 144 includes user identification (ID) 146 and time account type 148. The time account type 148 includes accrual frequency 150. In some implementations, the time account 144 may include additional and/or different items not shown in the diagram. Items may also be omitted from the time account 144. In some implementations, the user ID 146 stores user identifications (e.g., names). The time account type 148 stores definitions of time accounts (e.g., working time accounts, vacation time accounts, sick day time accounts, paid time off (PTO) time accounts). The accrual frequency 150 stores information about how frequently accruals are calculated within a certain period (e.g., annually, monthly, weekly, daily). The accrual rule 152 stores rules for accrual calculation (e.g., termination rule, standard rule). The job information 158 stores job related information (e.g., time fields, Full Time Equivalents (FTE), seniority). In some implementations, the database 142 may be associated with a separate device communicably connected to the accrual server 102 via network 170, e.g., in a cloud-based system or solution. In some other implementations, the database 142 may be a component of the accrual server 102.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

Figure 2:
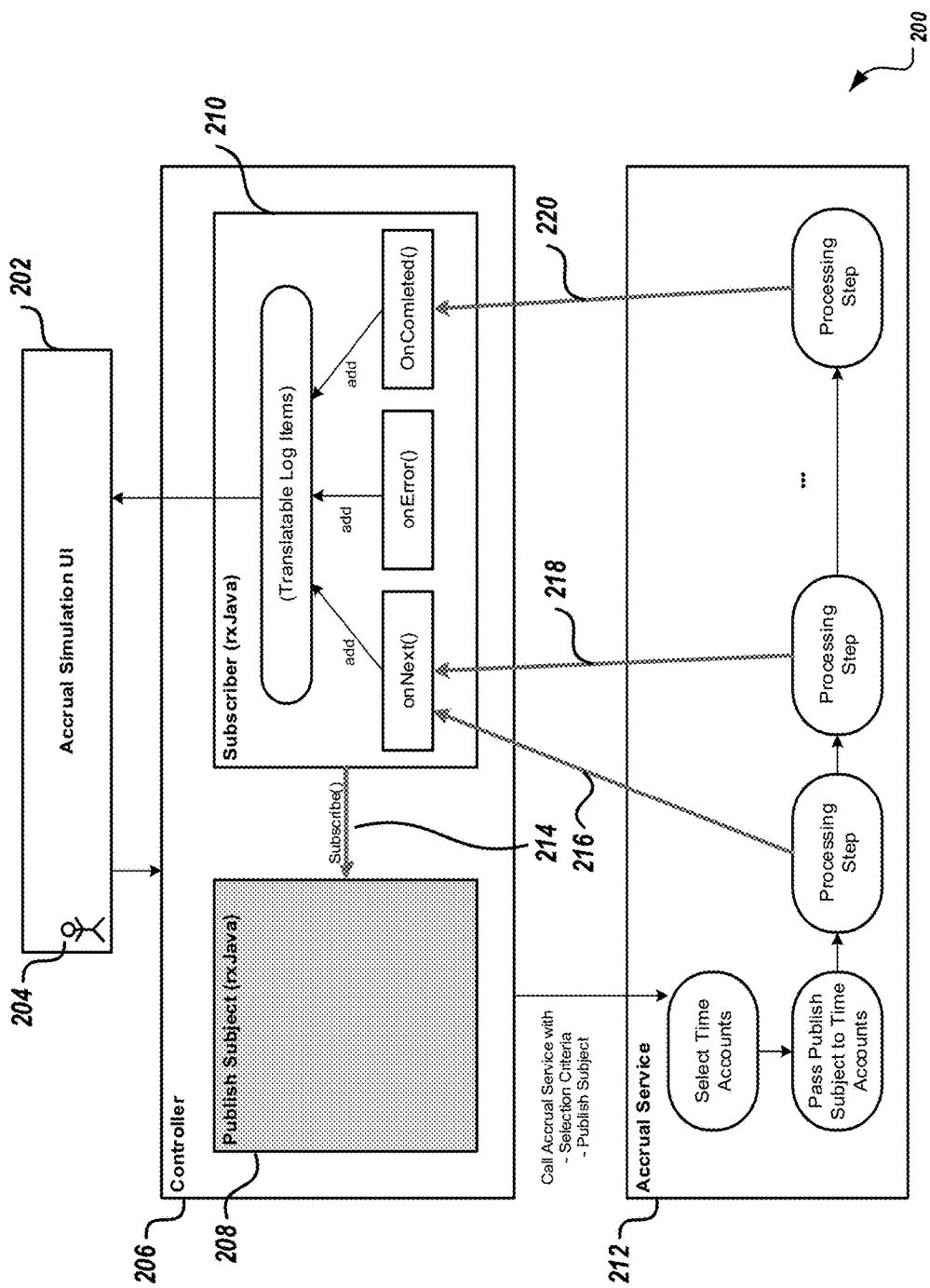
FIG. 2 is a block diagram illustrating an example architecture for performing an accrual simulation, according to an implementation.

FIG. 2 is a block diagram illustrating an example architecture 200 for performing an accrual simulation. In some implementations, the architecture 200 may include additional and/or different components, not shown in the diagram. Components may also be omitted from the architecture 200, and additional actions may be added to the architecture 200. The components illustrated in FIG. 2 may be similar to, or different from, those described in FIG. 1.

As illustrated, an accrual simulation UI 202 provides an interface for a user 204 to perform an accrual simulation. The UI 202 can call a backend accrual service 212 via a controller 206 with user input data (e.g., a user ID, a target date, a time account type). The controller 206 and the accrual service 212 may be executed by the same or different systems, as appropriate. As a result of the call, a list of log entries of the accrual simulation is returned to be displayed on the accrual simulation UI 202.

The controller 206 creates a publish subject 208, or publish subjects 208, (e.g., via RxJava) and passes the publish subject 208 along with the user input data to an accrual service 212. In addition, the controller may create a subscriber 210, or subscribers 210, (e.g., via RxJava) and subscribe 214 the subscriber 210 to the publish subject 208. The subscriber 210 defines what happens if the publish subject 208 pushes log information. For example, three methods can be implemented for the subscriber 210 (i.e., onNext, onError, and onCompleted). Whenever log information is pushed from the accrual service 212, onNext is called to collect the log information. When there is an unexpected application error of the accrual service 212 (e.g., the accrual service 212 may not return a result due to application failure), onError is called. All log entries up to the error point are already collected (e.g., via onNext). In addition, an error log entry can be pushed from the accrual service 212 and added to the log entries. When the accrual service 212 completes accrual calculation, onCompleted is called to collect the log completion information. Once all log entries are collected (e.g., when a completed event is triggered or when an error event is triggered), the subscriber 210 may translate the collected log entries into user-friendly language (e.g., user readable text) or into a user-friendly format and transmit to the accrual simulation UI 202 for display. In some implementations, the controller 206 may not create any subscribers. In some implementations, the created subscriber may not subscribe to the publish subject 208.

The accrual service 212 receives the publish subject 208 along with the user input data from the controller 206. Based on the user input data, the accrual service 212 may select a time account, or time accounts, to perform accrual calculation. The publish subject 208 is passed to the time account (e.g., the time account having the publish subject 208). The accrual service 212 then performs the accrual calculation via multiple processing steps that are available in a complete application of the accrual service 212. In some implementations, the processing steps are internal processing steps to the accrual calculation (e.g., time account determination, rule processing, validations). During the accrual calculation process, the publish subject 208 in the processed time account can push log information (e.g., internal information about the time account) to the subscriber 210, if the subscriber 210 subscribes to the publish subject 208. For example, log information is pushed onNext 216 and 218 and onCompleted 220. However, if the subscriber 210 does not subscribe to the publish subject 208 (e.g., omitting subscribe operation 214), no internal information will be logged and pushed onNext 216 and 218 and onCompleted 220.

Figure 3:
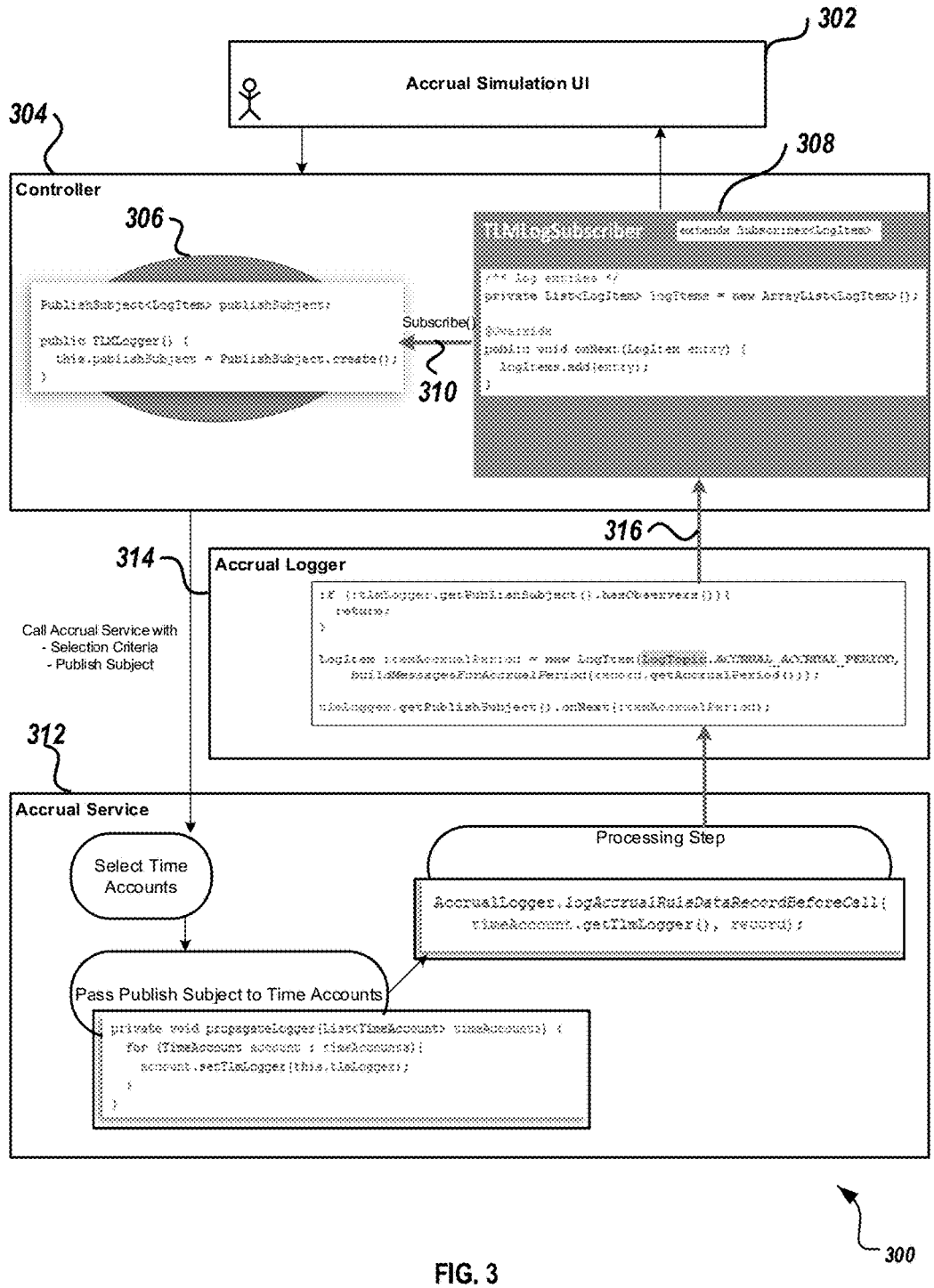
FIG. 3 is a block diagram illustrating an example code of the example architecture for performing an accrual simulation, according to an implementation.

FIG. 3 is a block diagram illustrating an example code 300 of the example architecture 200 for performing an accrual simulation. In some implementations, FIG. 3 may include additional and/or different components not shown in the diagram. Components may also be omitted from FIG. 3, and additional code may be added to the example code 300. The components illustrated in FIG. 3 may be similar to, or different from, those described in FIG. 1 and/or FIG. 2.

As illustrated, the example code only implements one subscriber (i.e., TLMLogSubscriber 308) in the controller 304. In some implementations, more than one subscribers can be implemented. The subscriber subscribes 310 to a publish subject 306 that is available during accrual calculation (i.e., accrual service 312). Whenever the accrual service 312 emits log events, the subscriber (i.e., TLMLogSubscriber 308) is notified, collects the log information, and prepares the log information for the accrual simulation UI 302 after the accrual service process ends.

The accrual service 312 is a class to calculate accruals. In the accrual service 312, code has been added to the class to log relevant information (i.e., emit event, for example, onNext). For example, whenever the accrual service 312 pushes a log event, a log item is created. In some implementations, the log item contains information about the log topic and translatable message information (e.g., TLMMessage).

The accrual service 312 is extended by a logger object (e.g., accrual logger 314). In some implementations, the accrual service 312 passes the publish subject together with log relevant data to the logger object. Whenever log information is needed, a method of a helper class (e.g., accrual logger 314) is called. The publish subject and all needed internal data are passed to the method. For example, the publish subject in the logger object can emit/log events (e.g., onNext, onError, on Completed). The logger object can be implemented to add additional functionalities of, for example, filtering log information and/or transforming log events. In operation, the accrual logger 314 checks if there is at least one subscriber for the publish subject. If there is at least one subscriber, log items are created and pushed 316 to the at least one subscriber based on internal information. If there is no subscriber, the remaining code in the accrual logger is not performed. As a result, the additional logger logic is only evaluated in an accrual simulation mode (e.g., with subscriber(s)) and not evaluated in a standard operation mode (e.g., running an accrual service application).

The following example pseudocode illustrates an example implementation of an accrual simulator.

```
@AjaxMethod
Public List<LogResult> getAccrualLog(String userId,
      String accountTypeExtCode, String date) throws
      ServiceApplicationException {
   // STEP 1: Select Time Account based on parameters
   // STEP 2: Call the accrual service for that time
   //       account and subcribe to publish subject
        AccrualService accrualService = new
          AccrualService( );
        TLMLogSubscriber subscriber = new
          TLMLogSubscriber( );
        accrualService.getTlmLogger( ).getPublishSubject( )
          .subscribe(subscriber);
        accrualService.updateAndCreateAccruals(
          timeAccounts, date);
        subscriber.unsubscribe( );
   // STEP 3: Build Result List
        List<LogResult> resultList = new
          ArrayList<LogResult>( );
        for(LogItem item : subscriber.getLogItems( ) ) {
          //add translated messages to the result list
        }
        return resultList;
      }
   public class LogItem {
        private LogTopic topic;
        private List<TLMMessage> messages;
   }
```

Figure 4:
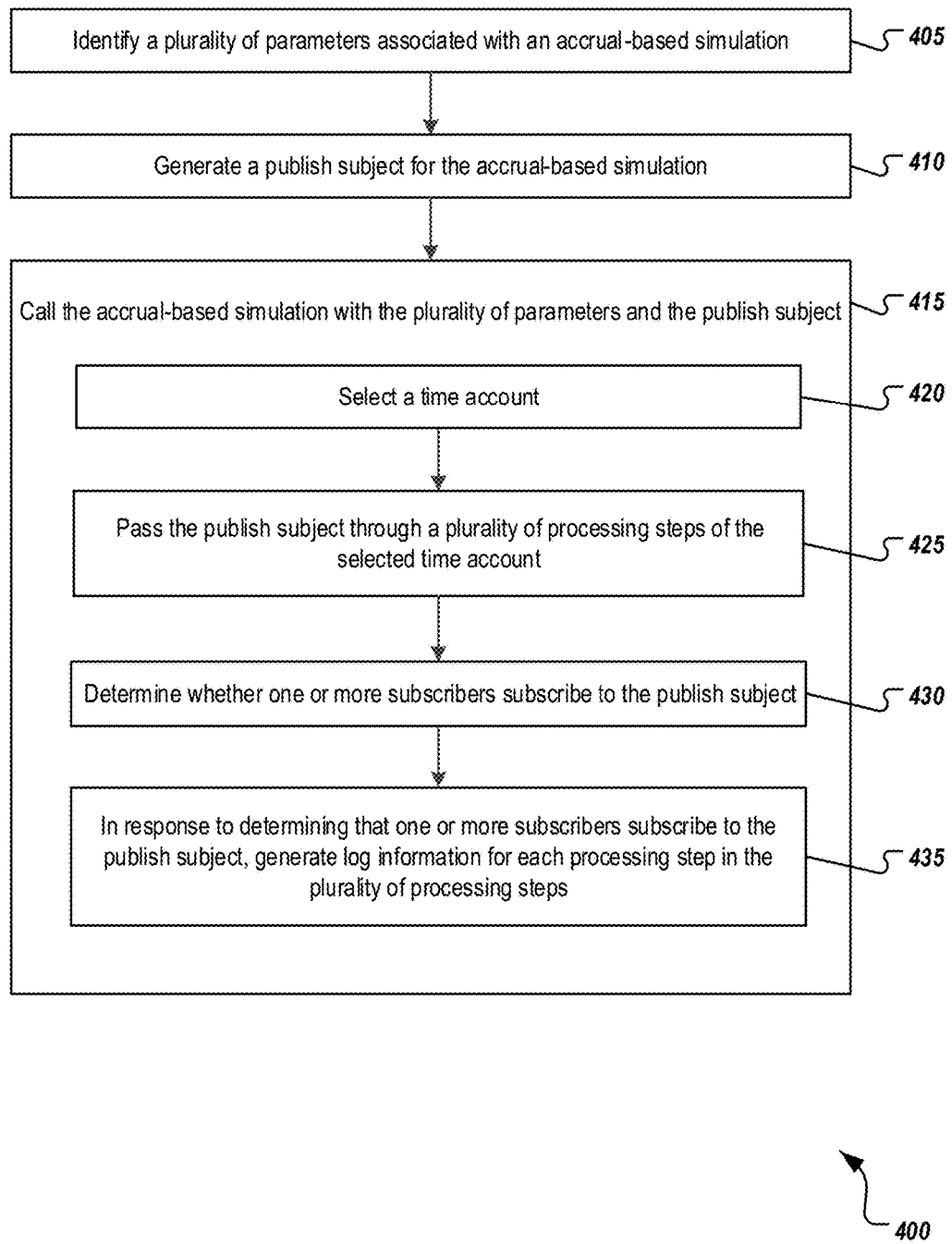
FIG. 4 is a flowchart of an example method for performing an accrual simulation, according to an implementation.

FIG. 4 is a flowchart of an example method 400 for performing an accrual simulation. It will be understood that method 400 and related methods may be performed, for example, by any suitable system, environment, software, and hardware, or a combination of systems, environments, software, and hardware, as appropriate. For example, one or more of a client, a server, or other suitable computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the accrual server 102 of FIG. 1.

At 405, parameters associated with an accrual-based simulation are identified. The accrual-based simulation calculates time account accruals. The parameters are selected by a user as input to the accrual-based simulation. In some implementations, the user selects the parameters on an accrual simulation user interface (UI) of the accrual-based simulation. The parameters include a date, a user identification (ID), and a time account type. In some cases, the parameters can include a set of accrual rules. The time account type includes a working time account, a vacation time account, a sick day time account, and a paid time off (PTO) time account. In some implementations, the time account type is the definition of a time account and is attached to a time type as a posting rule. The time type is assigned to a time profile and the time profile is assigned, via job information, to a user.

At 410, a publish subject is generated for the accrual-based simulation. The publish subject can be generated using reactive programming, for example, RxJava. At 415, the accrual-based simulation is called. When calling the accrual-based simulation, the parameters selected by the user and the generated publish subject are passed to the accrual-based simulation as input parameters. Calling the accrual-based simulation includes the following operations (i.e., 420, 425, 430, and 435).

At 420, a time account is selected. In some implementations, the time account is selected based on the passed parameters selected by the user. The selected time account is associated with a set of accrual settings. The set of accrual settings includes a set of accrual rules and an accrual frequency. The set of accrual rules includes, for example, accrual rules for standard accounts and accrual rules for seniority accounts. The accrual frequency defines how many accruals are calculated over a period of time. The accrual frequency includes, for example, annually, monthly, bi-weekly, weekly, and daily frequencies.

At 425, the publish subject is passed through multiple processing steps of the selected time account. For example, if the accrual frequency is monthly for the selected time account, twelve accruals will be calculated for that year. There will be twelve processing steps of the selected time account for calculating twelve accruals, each accrual corresponding to a particular month in that year.

At 430, whether one or more subscribers subscribe to the publish subject is determined. At 435, in response to a determination that one or more subscribers subscribe to the publish subject, log information is generated for each processing step in the plurality of processing steps. The log information includes internal data for calculating accruals for the selected time account. In some implementations, the internal data is translated into log messages first to be included in the log information.

Additional process actions (not shown in FIG. 4) may be added to extend the functionalities of the example method. For example, after generating the log information for each processing step, the generated log information can be filtered to remove unwanted information. After generating the publish subject and before calling the accrual-based simulation, one or more subscribers can be generated or defined. The one or more subscribers can subscribe to the publish subject and/or other subject(s). The one or more subscribers can be generated using reactive programming, for example, RxJava. In response to a determination that one or more subscribers subscribe to the publish subject, the generated log information is pushed to the one or more subscribers at the end of the accrual calculation. The log information can be translated into language-specific text before being displayed on the accrual simulation UI for user review.

The example method 400 shown in FIG. 4 can be modified or reconfigured to include additional, fewer, or different actions (not shown in FIG. 4), which can be performed in the order shown or in a different order. In some implementations, one or more of the actions shown in FIG. 4 can be repeated or iterated, for example, until a terminating condition is reached. In some implementations, one or more of the individual actions shown in FIG. 4 can be executed as multiple separate actions, or one or more subsets of the actions shown in FIG. 4 can be combined and executed as a single action. In some implementations, one or more of the individual actions shown in FIG. 4 may also be omitted from the example method 400.

Alternative methods of performing an accrual simulation may be used in other implementations. Those described herein are examples and are not meant to be limiting.

Described implementations of the subject matter can include one or more features, alone or in combination.

For example, in a first implementation, a computer-implemented method includes identifying multiple parameters associated with an accrual-based simulation, the accrual-based simulation calculating time account accruals and the multiple parameters being selected by a user on a user interface (UI) of the accrual-based simulation; generating a publish subject for the accrual-based simulation; and calling the accrual-based simulation with the multiple parameters and the publish subject. Calling the accrual-based simulation includes selecting a time account; passing the publish subject through multiple processing steps of the selected time account; determining whether one or more subscribers subscribe to the publish subject; and in response to determining that one or more subscribers subscribe to the publish subject, generating log information for each processing step in the multiple processing steps.

The foregoing and other described implementations can each optionally include one or more of the following features:

A first feature, combinable with any of the following features, wherein the multiple parameters include a date, a user identification (ID), and a time account type.

A second feature, combinable with any of the previous or following features, wherein the time account type includes a working time account, a vacation time account, a sick day time account, and a paid time off (PTO) time account.

A third feature, combinable with any of the previous or following features, wherein the selected time account is associated with a set of accrual settings and the set of accrual settings includes a set of accrual rules and an accrual frequency.

A fourth feature, combinable with any of the previous or following features, wherein selecting the time account is based on the multiple parameters.

A fifth feature, combinable with any of the previous or following features, comprising, after generating the log information for each processing step, filtering the generated log information.

A sixth feature, combinable with any of the previous or following features, comprising after generating the publish subject and before calling the accrual-based simulation, defining one or more subscribers subscribing to the publish subject; and in response to determining that one or more subscribers subscribe to the publish subject, transmitting the generated log information to the one or more subscribers.

A seventh feature, combinable with any of the previous or following features, comprising translating the log information into language-specific text; and displaying the language-specific text on the UI of the accrual-based simulation for user review.

In a second implementation, a computer program product comprising computer-readable instructions, which, when loaded and executed on a computer system, cause the computer system to perform operations comprising: identifying multiple parameters associated with an accrual-based simulation, the accrual-based simulation calculating time account accruals and the multiple parameters being selected by a user on a user interface (UI) of the accrual-based simulation; generating a publish subject for the accrual-based simulation; and calling the accrual-based simulation with the multiple parameters and the publish subject, including: selecting a time account; passing the publish subject through multiple processing steps of the selected time account; determining whether one or more subscribers subscribe to the publish subject; and in response to determining that one or more subscribers subscribe to the publish subject, generating log information for each processing step in the multiple processing steps.

The foregoing and other described implementations can each, optionally include one or more of the following features:

A first feature, combinable with any of the following features, wherein the multiple parameters include a date, a user identification (ID), and a time account type.

A second feature, combinable with any of the previous or following features, wherein the time account type includes a working time account, a vacation time account, a sick day time account, and a paid time off (PTO) time account.

A third feature, combinable with any of the previous or following features, wherein the selected time account is associated with a set of accrual settings and the set of accrual settings includes a set of accrual rules and an accrual frequency.

A fourth feature, combinable with any of the previous or following features, wherein selecting the time account is based on the multiple parameters.

A fifth feature, combinable with any of the previous or following features, comprising, after generating the log information for each processing step, filtering the generated log information.

A sixth feature, combinable with any of the previous or following features, comprising, after generating the publish subject and before calling the accrual-based simulation, defining one or more subscribers subscribing to the publish subject; and in response to determining that one or more subscribers subscribe to the publish subject, transmitting the generated log information to the one or more subscribers.

A seventh feature, combinable with any of the previous or following features, comprising translating the log information into language-specific text; and displaying the language-specific text on the UI of the accrual-based simulation for user review.

In some implementations, the computer program product can be implemented on a non-transitory, computer-readable medium storing one or more instructions executable by a computer system to perform the above-described operations.

In a third implementation, a computer system, comprising: one or more processors; and a computer-readable medium storing instructions executable by the one or more processors to perform operations comprising: identifying multiple parameters associated with an accrual-based simulation, the accrual-based simulation calculating time account accruals and the multiple parameters being selected by a user on a user interface (UI) of the accrual-based simulation; generating a publish subject for the accrual-based simulation; and calling the accrual-based simulation with the multiple parameters and the publish subject, including: selecting a time account; passing the publish subject through multiple processing steps of the selected time account; determining whether one or more subscribers subscribe to the publish subject; and in response to determining that one or more subscribers subscribe to the publish subject, generating log information for each processing step in the multiple processing steps.

The foregoing and other described implementations can each, optionally include one or more of the following features:

A first feature, combinable with any of the following features, wherein the multiple parameters include a date, a user identification (ID), and a time account type.

A second feature, combinable with any of the previous or following features, wherein the time account type includes a working time account, a vacation time account, a sick day time account, and a paid time off (PTO) time account.

A third feature, combinable with any of the previous or following features, wherein the selected time account is associated with a set of accrual settings and the set of accrual settings includes a set of accrual rules and an accrual frequency.

A fourth feature, combinable with any of the previous or following features, wherein selecting the time account is based on the multiple parameters.

A fifth feature, combinable with any of the previous or following features, comprising, after generating the log information for each processing step, filtering the generated log information.

A sixth feature, combinable with any of the previous or following features, comprising after generating the publish subject and before calling the accrual-based simulation, defining one or more subscribers subscribing to the publish subject; and in response to determining that one or more subscribers subscribe to the publish subject, transmitting the generated log information to the one or more subscribers.

A seventh feature, combinable with any of the previous or following features, comprising translating the log information into language-specific text; and displaying the language-specific text on the UI of the accrual-based simulation for user review.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A non-transitory computer storage medium encoded with a computer program, the program comprising instructions that, when executed by one or more computers, cause the one or more computers to perform operations comprising:
   identifying a plurality of parameters associated with a simulation, wherein the simulation is associated with an accrual service that calculates time account accruals, and wherein the plurality of parameters are selected by a user on a user interface (UI) of the simulation;
   generating a publish subject for the simulation; and
   calling the simulation with the plurality of parameters and the publish subject, including:
      selecting a time account to perform an accrual simulation;
      passing the publish subject through a plurality of processes in the accrual service and associated with the selected time account;
      determining whether one or more subscribers subscribe to the publish subject; and
      in response to determining that one or more subscribers subscribe to the publish subject;
         generating, by an accrual logger, log information for each process in the plurality of processes, wherein the generated log information includes internal information of the selected time account; and
         displaying the log information on the UI of the simulation for user review.

2. The medium of claim 1, wherein the plurality of parameters includes a date, a user identification (ID), and a time account type.

3. The medium of claim 2, wherein the time account type includes a working time account, a vacation time account, a sick day time account, and a paid time off (PTO) time account.

4. The medium of claim 1, wherein the selected time account is associated with a set of accrual settings and the set of accrual settings includes a set of accrual rules and an accrual frequency.

5. The medium of claim 1, wherein selecting the time account is based on the plurality of parameters.

6. The medium of claim 1, the operations further comprising:
   after generating the log information for each process, filtering the generated log information.

7. The medium of claim 1, the operations further comprising:
   after generating the publish subject and before calling the simulation, defining one or more subscribers subscribing to the publish subject; and
   in response to determining that one or more subscribers subscribe to the publish subject, transmitting the generated log information to the one or more subscribers.

8. The medium of claim 1, the operations further comprising:
   translating the log information into language-specific text; and
   displaying the language-specific text on the UI of the simulation for user review.

9. A computerized method performed by one or more processors, the method comprising:
   identifying a plurality of parameters associated with a simulation, wherein the simulation is associated with an accrual service that calculates time account accruals, and wherein the plurality of parameters are selected by a user on a user interface (UI) of the simulation;
   generating a publish subject for the simulation; and
   calling the simulation with the plurality of parameters and the publish subject, including:
      selecting a time account to perform an accrual simulation;
      passing the publish subject through a plurality of processes in the accrual service and associated with the selected time account;
      determining whether one or more subscribers subscribe to the publish subject; and
      in response to determining that one or more subscribers subscribe to the publish subject;
         generating, by an accrual logger, log information for each process in the plurality of processes, wherein the generated log information includes internal information of the selected time account; and
         displaying the log information on the UI of the simulation for user review.

10. The method of claim 9, wherein the plurality of parameters includes a date, a user identification (ID), and a time account type.

11. The method of claim 10, wherein the time account type includes a working time account, a vacation time account, a sick day time account, and a paid time off (PTO) time account.

12. The method of claim 9, wherein the selected time account is associated with a set of accrual settings and the set of accrual settings includes a set of accrual rules and an accrual frequency.

13. The method of claim 9, wherein selecting the time account is based on the plurality of parameters.

14. The method of claim 9, further comprising:
   after generating the log information for each process, filtering the generated log information.

15. The method of claim 9, further comprising:
   after generating the publish subject and before calling the simulation, defining one or more subscribers subscribing to the publish subject; and
   in response to determining that one or more subscribers subscribe to the publish subject, transmitting the generated log information to the one or more subscribers.

16. The method of claim 9, further comprising:
   translating the log information into language-specific text; and displaying the language-specific text on the UI of the simulation for user review.

17. A system, comprising:
one or more processors; and
a computer-readable medium storing instructions executable by the one or more processors to perform operations comprising:
identifying a plurality of parameters associated with a simulation, wherein the simulation is associated with an accrual service that calculates time account accruals, and wherein the plurality of parameters are selected by a user on a user interface (UI) of the simulation;
generating a publish subject for the simulation; and
calling the simulation with the plurality of parameters and the publish subject, including:
selecting a time account to perform an accrual simulation;
passing the publish subject through a plurality of processes in the accrual service and associated with the selected time account;
determining whether one or more subscribers subscribe to the publish subject; and
in response to determining that one or more subscribers subscribe to the publish subject;
generating, by an accrual logger, log information for each process in the plurality of processes, wherein the generated log information includes internal information of the selected time account; and
displaying the log information on the UI of the simulation for user review.

18. The system of claim 17, wherein the plurality of parameters includes a date, a user identification (ID), and a time account type.

19. The system of claim 18, wherein the time account type includes a working time account, a vacation time account, a sick day time account, and a paid time off (PTO) time account.

20. The system of claim 17, wherein the selected time account is associated with a set of accrual settings and the set of accrual settings includes a set of accrual rules and an accrual frequency.

* * * * *